United States Patent
Kothari et al.

(10) Patent No.: US 10,085,205 B2
(45) Date of Patent: Sep. 25, 2018

(54) CROWD SOURCING NETWORK QUALITY

(71) Applicant: International Business Machines Corporation, Armonk, NY (US)

(72) Inventors: Ravi Kothari, New Delhi (IN); Dilip Krishnaswamy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/259,986

(22) Filed: Sep. 8, 2016

(65) Prior Publication Data
US 2018/0070298 A1 Mar. 8, 2018

(51) Int. Cl.
*H04W 48/18* (2009.01)
*H04L 12/26* (2006.01)

(52) U.S. Cl.
CPC .......... *H04W 48/18* (2013.01); *H04L 43/08* (2013.01)

(58) Field of Classification Search
CPC .................................................... H04W 48/18
See application file for complete search history.

(56) References Cited

U.S. PATENT DOCUMENTS

| | | | |
|---|---|---|---|
| 8,565,766 B2 | 10/2013 | Scherzer et al. | |
| 8,825,876 B2 | 9/2014 | Krishnaswamy et al. | |
| 2006/0126532 A1* | 6/2006 | Binding | H04W 48/18 370/254 |
| 2010/0022263 A1* | 1/2010 | Stamoulis | H04W 24/02 455/501 |
| 2012/0064895 A1* | 3/2012 | Zhang | H04W 48/16 455/436 |
| 2014/0036696 A1* | 2/2014 | Lee | H04W 48/18 370/252 |
| 2016/0044692 A1 | 2/2016 | Egner et al. | |
| 2016/0205557 A1* | 7/2016 | Tuupola | H04L 63/107 455/411 |
| 2016/0242053 A1* | 8/2016 | Leontiadis | H04L 41/065 |

FOREIGN PATENT DOCUMENTS

| | | |
|---|---|---|
| WO | WO2013188545 A1 | 12/2013 |
| WO | WO2014106073 A1 | 7/2014 |

* cited by examiner

*Primary Examiner* — Mazda Sabouri
(74) *Attorney, Agent, or Firm* — Ference & Associates LLC

(57) ABSTRACT

One embodiment provides a method, including: utilizing at least one processor to execute computer code that performs the steps of: receiving information for a plurality of telecommunications networks, from at least one device, regarding quality of network access between at least one of a plurality of user devices and at least one of the plurality of telecommunications networks; determining quality of each of the plurality of telecommunications networks by aggregating and storing the information received from the at least one device; receiving a request from a device of a user to connect to a telecommunications network; and providing, based upon the determined quality of the plurality of telecommunications networks, a recommendation of a telecommunications network from the plurality of telecommunications networks for connection by the device of a user. Other aspects are described and claimed.

20 Claims, 4 Drawing Sheets

CROWD SOURCING NETWORK QUALITY

BACKGROUND

Many information handling devices (e.g., cellular phones, smart phones, tablets, smart TVs, etc.) allow a user to connect to a telecommunications network. For example, a user connects to a telecommunications network when making a telephone call, accessing information from the Internet, making a video call, and the like. Generally, these devices have subscriber identity module (SIM) cards, which tie the device to a particular network operator. Some information handling devices can house and use multiple SIM cards. With multiple SIM cards the device is no longer tied to only a single network operator. Rather, the device can connect to different telecommunications networks using different SIM cards within the device. Additionally, devices with an electronic SIM (e-SIM) capability or a software virtual SIM (v-SIM) capability allow consumers to switch network operators without requiring a new SIM card that is tied directly to that operator. Thus, in devices with multiple SIM cards, or with an e-SIM capability, or with a v-SIM software SIM, the device can access multiple telecommunications networks.

BRIEF SUMMARY

In summary, one aspect of the invention provides a method, comprising: utilizing at least one processor to execute computer code that performs the steps of: receiving information for a plurality of telecommunications networks, from at least one device, regarding quality of network access between at least one of a plurality of user devices and at least one of the plurality of telecommunications networks; determining quality of each of the plurality of telecommunications networks by aggregating and storing the information received from the at least one device; receiving a request from a device of a user to connect to a telecommunications network; and providing, based upon the determined quality of the plurality of telecommunications networks, a recommendation of a telecommunications network from the plurality of telecommunications networks for connection by the device of a user.

Another aspect of the invention provides an apparatus, comprising: at least one processor; and a computer readable storage medium having computer readable program code embodied therewith and executable by the at least one processor, the computer readable program code comprising: computer readable program code that receives information for a plurality of telecommunications networks, from at least one device, regarding quality of network access between at least one of a plurality of user devices and at least one of the plurality of telecommunications networks; computer readable program code that determines quality of each of the plurality of telecommunications networks by aggregating and storing the information received from the at least one device; computer readable program code that receives a request from a device of a user to connect to a telecommunications network; and computer readable program code that provides, based upon the determined quality of the plurality of telecommunications networks, a recommendation of a telecommunications network from the plurality of telecommunications networks for connection by the device of a user.

An additional aspect of the invention provides a computer program product, comprising: a computer readable storage medium having computer readable program code embodied therewith, the computer readable program code comprising: computer readable program code that receives information for a plurality of telecommunications networks, from at least one device, regarding quality of network access between at least one of a plurality of user devices and at least one of the plurality of telecommunications networks; computer readable program code that determines quality of each of the plurality of telecommunications networks by aggregating and storing the information received from the at least one device; computer readable program code that receives a request from a device of a user to connect to a telecommunications network; and computer readable program code that provides, based upon the determined quality of the plurality of telecommunications networks, a recommendation of a telecommunications network from the plurality of telecommunications networks for connection by the device of a user.

A further aspect of the invention provides a method, comprising: receiving quality information, from at least one device, for a plurality of telecommunications networks, wherein the quality information is based upon a communication access to a telecommunications network by a user device; determining quality of each of the plurality of telecommunications networks by analyzing the quality information from the at least one device; receiving a request from a user device to identify a telecommunications network to be used for a network access; and identifying a telecommunications network from the plurality of telecommunications networks for the network access by the user device.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
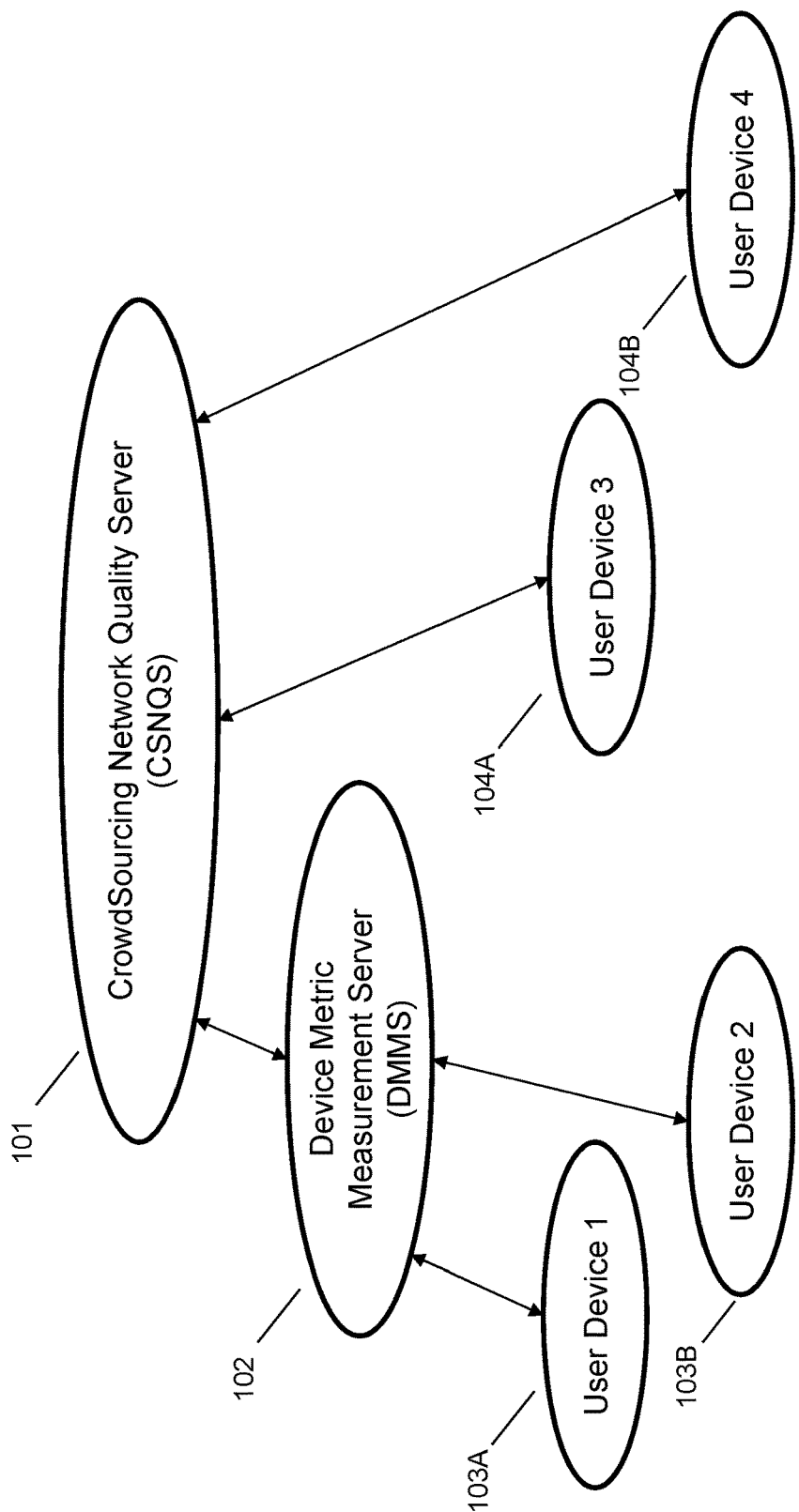
FIG. 1 illustrates an example crowd sourcing network quality server system.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

In different situations a user may prefer one telecommunications network operated by one operator over a network operated by a different operator. For example, one network operator may have better coverage in a particular geographical region than another network operator. As another example, the load on one network may be significantly more than the load on another network which may degrade the network access or connection that a user has with the network (e.g., telephone call, data access, video call, etc.). Some user devices provide for multiple SIM slots within the device, each SIM being tied to a different network operator.

Alternatively, an e-SIM or a v-SIM capability on the device can be used to connect to different telecommunications networks operated by different network operators. An e-SIM (electronic-SIM) capability can allow one or more electronic SIM card numbers to be programmed into the device (e.g., 4 e-SIMs, 8 e-SIMs, etc.), where the e-SIMs are not removable but programmable. E-SIMs require a programmable hardware component on the device platform that can be reprogrammed to utilize a different network if needed. However, typically, only a fixed number of e-SIMs are possible based on the number of programmable e-SIM components available on the platform. A v-SIM (virtual-SIM) capability allows the SIM functionality to execute purely as software on the device platform so that multiple vSIMs can be supported in software. In general, a large number of v-SIMs can be supported, only limited by the amount of memory that can be allocated on the platform for these v-SIMs. However, current solutions provide that the network for the network access is chosen based upon a preference, for example, the user has selected a primary network. However, this may not be the network that can provide the best quality at the particular time or geographic region that the user is trying to access the network.

Accordingly, an embodiment provides a method of identifying the quality of a particular telecommunications network or a plurality of networks and identifying the network having a quality meeting or exceeding a predetermined threshold. To determine the quality of the network an embodiment receives information from a plurality of devices that have connected to different telecommunications networks. The information provided by the devices identifies one or more quality metrics (e.g., quality of the connection to the network or network access, the link throughput, link delay, network path throughput, network path delay, number of dropped packets, etc.) for that user during that connection.

Alternatively or additionally, a server that was connected to the device during the call can provide information about the quality of the connection such as based on measured metrics (e.g., throughput or delay at the server, measurement by the device on the throughput, delay, link quality, etc.) that were reported to the server prior to the call completion. For example, referring to FIG. 1, one or more user devices 103A and 103B may be in communication with a Device Metric Measurement Server (DMMS) 102. The DMMS 102 may then be in communication with a Crowd Sourcing Network Quality Server (CSNQS) 101. Thus, quality of the network connection for the device can be obtained indirectly via a Device Metric Measurement Server (DMMS) that has previously received the information from the device, a DMMS that has measured the relevant metrics (e.g., throughput, delay on the network path between a device and the DMMS, etc.), or the like. Alternatively, the user devices 104A and 140B may be in direct communication with the CSNQS 101.

In emerging network architecture based on network functions virtualization, a virtual network function (VNF) operating in a virtual machine or a container in an NFV (Network Functions Virtualization) data center can provide the DMMS the capability to measure the network path quality metrics (e.g., throughput, delay, etc.) or receive network quality metrics measured by the device. Such a metrics measurement server VNF instance can communicate the measured and/or received device metrics to the crowd sourcing server. The Crowd Sourcing Network Quality Server (CSNQS) can also operate as a VNF in a Virtual Machine (VM) or container in an NFV data center.

Figure 2:
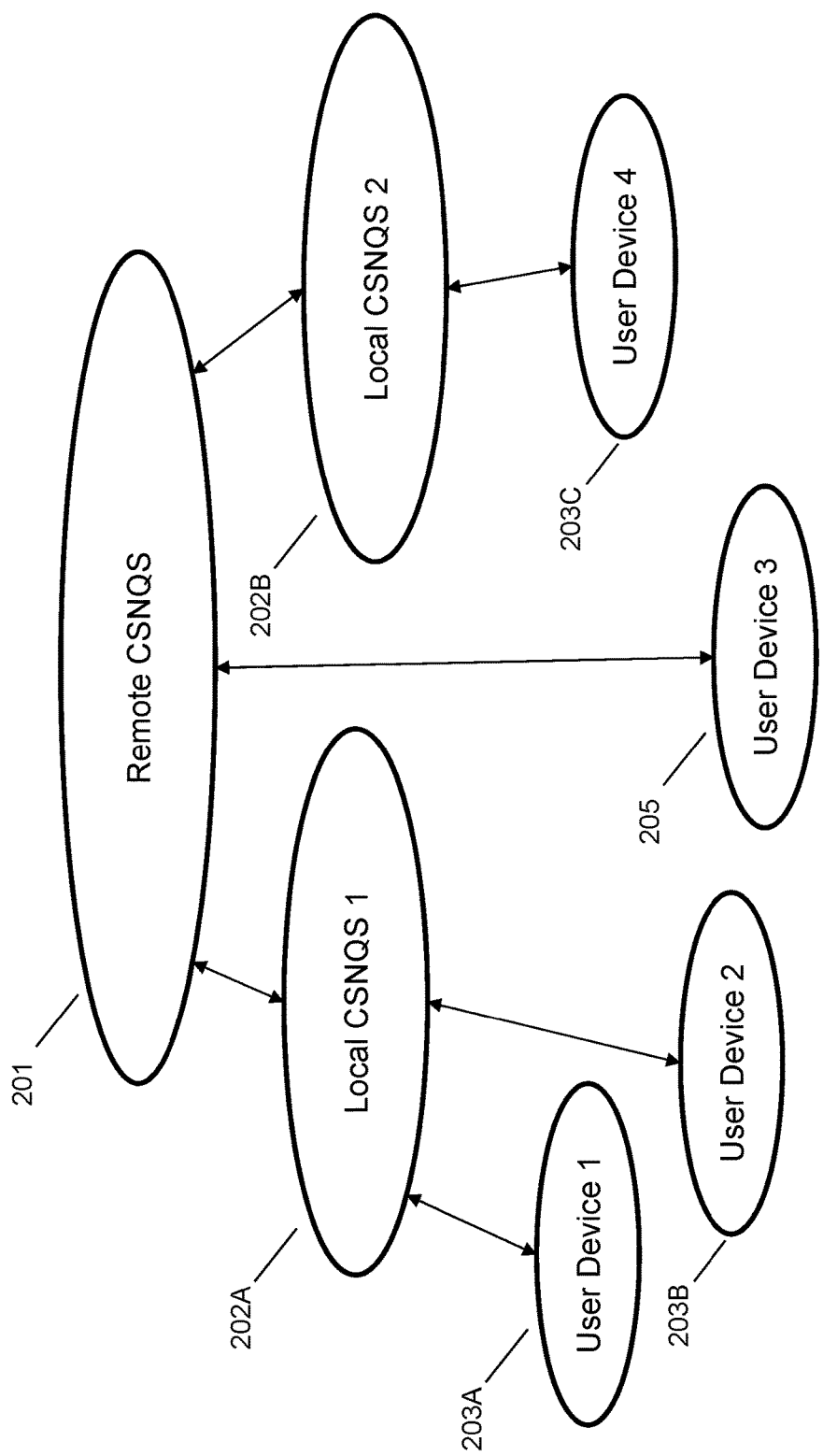
FIG. 2 illustrates an example distributed crowd sourcing network quality server system.

The NFV data center for the Crowd Sourcing Network Quality Virtual Network Function instance and the Metrics Measurement Virtual Network Function instance may reside in different NFV data centers or these functions may share the same NFV data center. The VNFs can be hosted hierarchically across NFV data centers, for example as shown in FIG. 2, where edge NFV data centers 202A and 202B may serve local geographical regions, whereas an NFV data center 201 that is higher up the hierarchy can manage information across lower/edge NFV data centers 202A and 202B. For example, user devices 203A, 203B, and 203C that are static or quasi-static can be associated with VNF instances for these DMM and server functions in an NFV data center (e.g., local CSNQS, DMMS servers, etc.) 202A and 202B that are lower in the hierarchy or serving edge users in the network, whereas user devices 205 that are highly mobile can be associated with VNF instances for these server functions in NFV data centers that are higher up the hierarchy (e.g., connected to a remote CSNQS or DMMS server further away from the user) 201. In general, the CSNQS can gather information from devices directly, from DMM servers, from external sources such as a social media network, or the like, to determine information about a particular network.

The data center that is selected for interaction between the user device or DMMS and the CSNQS may be based upon at least one metric either associated with the user device or DMMS or the CSNQS itself. For example, as discussed above, the selected CSNQS may be based upon the mobility of the user device or DMMS. For example, for highly mobile devices one CSNQS may be selected, whereas for static devices a different CSNQS may be selected. Other metrics may be used to make the selection. For example, the metrics may include the location of the device (e.g., with respect to the CSNQS, the geographic location of the device, etc.), the location of the CSNQS or data center, the end-to-end latency between the user device or DMMS and the CSNQS or data center, and the like.

As an example, a user may connect to Network A when making a telephone call. During the telephone call the user may experience static and dropped words. Thus, the quality of that telephone call may be identified as poor. As more users connect to this network, or other networks, each user can provide feedback on the quality of the network access. In one embodiment, the user provided feedback may be done explicitly by the user, for example, through a survey at the end of the network access requesting the user provide feedback. In one embodiment, the user device may provide for an application that can capture statistics on the network access. For example, the application may determine how a network access was disconnected (e.g., call dropped, user ended, etc.), the signal strength during the network access, and the like.

After receiving the information from the users, an embodiment may determine the quality of a particular network. The quality may be determined for a particular network in a general sense. However, the quality may also be determined for a particular geographic region, during a particular time period, and the like. In determining the network quality, an embodiment may aggregate and store the information. In aggregating the information, an embodiment may average the information received from multiple users for a network. For example, if one user provides a quality rating of one and another user provides a quality rating of five, an embodiment may identify the quality of the network as a three.

Upon receiving a request from a device of a user to connect to a network, an embodiment may access the stored information to determine the network having the best quality for the user's particular use. For example, one network may provide better quality for a data-based network access, but a different network provides better quality for a voice-based network access. Using this information an embodiment may provide a recommendation to the user regarding which network should be connected to. In one embodiment the recommendation may additionally be based upon criteria provided by the user. For example, the user may indicate that only a network having no cost associated with it should be used for connections by the user's device(s). The user or user device can then select the network to be used for the desired network access. Thus, embodiments provide a method of crowd sourcing information about the quality of different telecommunications networks to identify the network having the best quality for a user who is currently trying to connect to a network and having the option of multiple networks.

Such a system provides a technical improvement over current systems for connecting to telecommunications networks in that a user can select a telecommunications network that would provide the best quality for the requested network access. The system as described herein can use information gathered from a large number of people and aggregate the information to determine the quality of a network. Additionally, since network quality can vary between time periods and geographical regions, embodiments can determine network quality information for a particular region, time frame, and the like. Not only can the systems, as described herein, process large amounts of information received from many different users, but they can also process the information quickly and efficiently to provide a recommendation when a user requests a network access. Thus, the systems and methods described herein provide a method for identifying the network that a user should connect to based upon the quality of the network and, in some embodiments, additionally, based upon criteria provided by the user.

Figure 3:
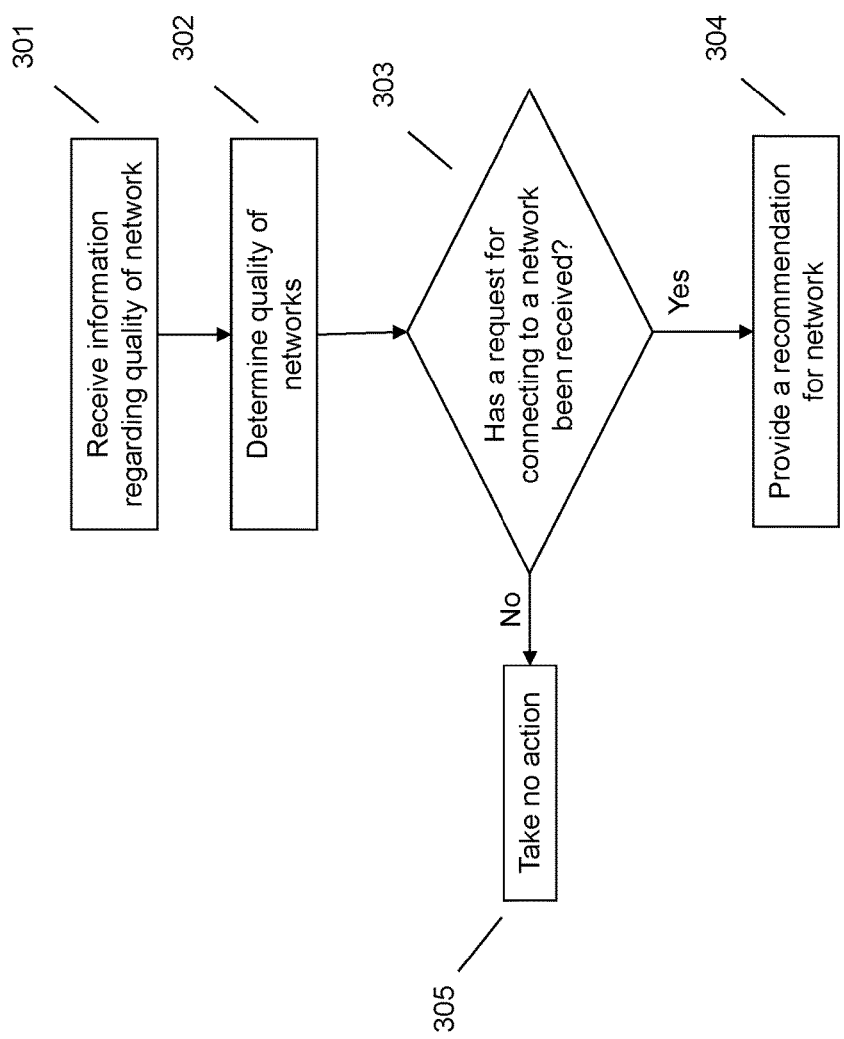
FIG. 3 illustrates a method of crowd sourcing network quality.
Figure 4:
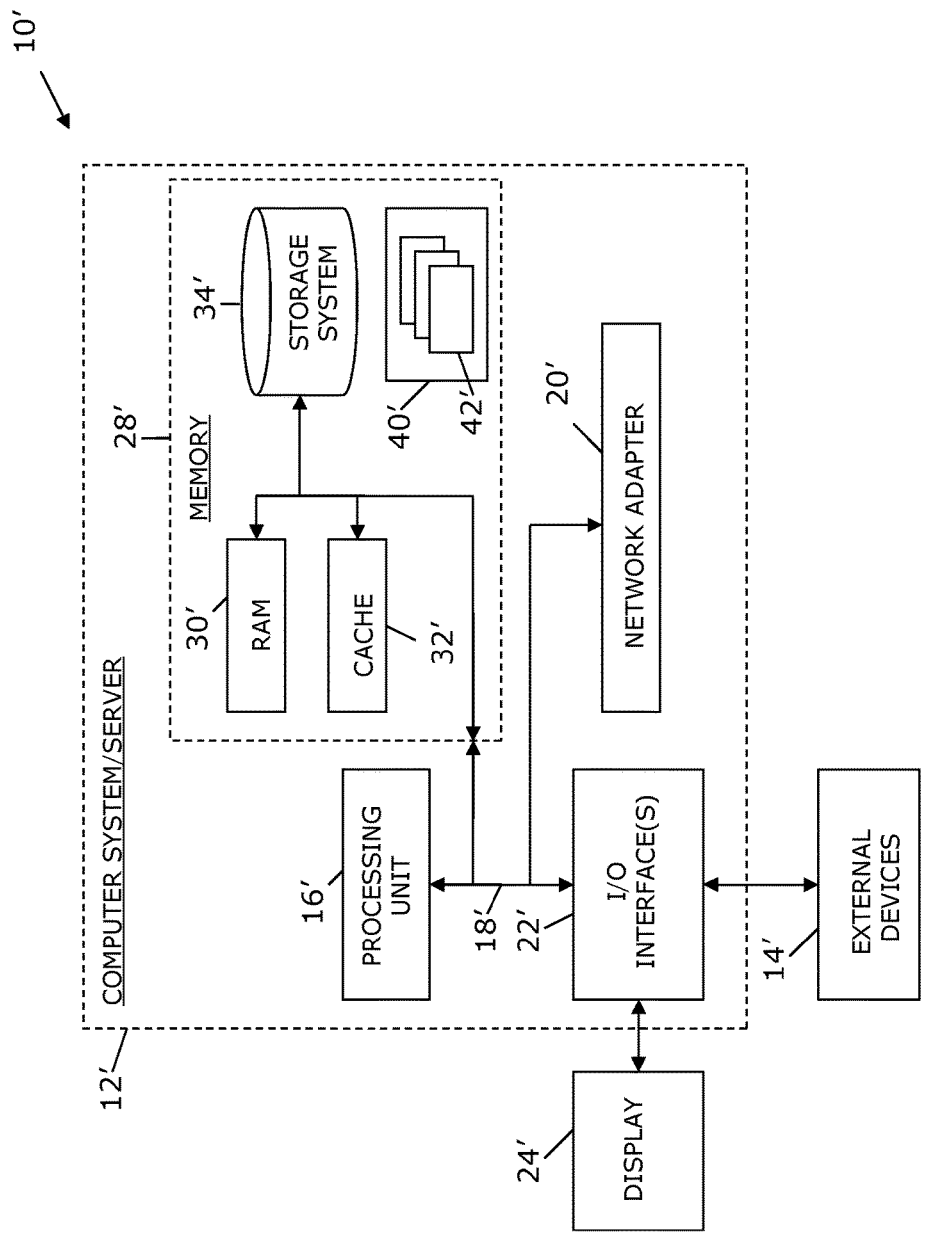
FIG. 4 illustrates a computer system.

Referring now to FIG. 3 at 301 an embodiment may receive information for a plurality of telecommunications networks from a plurality of user devices. The information may be received either directly from the device without user input, for example, through an application installed on the device, program measured attributes, and the like. The information may also be received in the form of a user response, for example, in response to a survey, the user manually inputting the information, and the like. The information may also be received through a third-party, for example, mined from a social media Internet site, through feedback provided by a user through an Internet survey, and the like. The received information may be related to the quality of a network access (e.g., voice-based network access, data-based network access, etc.) between a user device and a telecommunication network. As an example, one hundred users may access four different networks. For ease of understanding, assume that the users are evenly split among the networks. Each of these users can then provide information regarding the quality of their latest network access to the network that they were connected to. Thus, the system would receive quality information from twenty-five different users for each of the four networks.

For ease of understanding the term quality is used throughout this disclosure. However, one skilled in the art should understand that the term quality can include one or more metrics related to a network, for example, the wireless link quality (e.g., throughput, congestion, or delay on the access link between the device and the network, etc.), the price (cost) of connectivity for the network, dynamic path quality (e.g., throughput, congestion, or delay on the network path between the device and a packet gateway in the network, etc.), a path quality (e.g., throughput, congestion, or delay on the end-to-end path between the device and a server (e.g., cloud server, edge server, application server on the Internet, etc.), etc.), and the like.

The quality information can be provided in a variety of formats. In one embodiment the quality information may be provided as a numerical-type value, for example, a number on a scale, a number of stars rating, and the like. For example, a user may provide a quality rating on a scale of one to five. The quality rating may also be provided as a word-type value, for example, good, fair, poor, and the like. In providing the quality rating a user may be provided with descriptions of what each rating represents in order to make the ratings more consistent. The quality rating may also be derived based in part on predetermined criteria or a predetermined condition. In one embodiment the predetermined criteria may include the duration of a dropped call (e.g., a call being dropped immediately may have a poorer quality than a call dropped thirty minutes into the call, etc.), a quality measurement, regarding the connection, on the device (e.g., number of dropped words, amount of noise or static produced during the network access, peak signal to noise ratio (PSNR), the strength of the network signal, etc.), and the like.

The quality information, or reported metrics, may be normalized values (e.g., a normalized value from 0 to 1), may fall into buckets (e.g., one of five buckets including 0 to 0.2, 0.2 to 0.4, 0.4 to 0.6, 0.6 to 0.8, and 0.8 to 1), may be absolute values for the measured data, may be other alternate/scale representations for a metric, and the like. Alternative representations may include, for example, providing a higher value for a normalized metric for a lower value of the absolute value of the metric. As an example, a low-priced connectivity may get a high value (e.g., 0.8) for a normalized metric for the price of connectivity, whereas a high-priced connectivity may get a low value (e.g., 0.3) for the price of connectivity.

In one embodiment to receive the information, the system may request a quality update from a user device. For example, if the system identifies a change in a network quality, the system may ping a user device which is currently connected to the desired network to confirm the change in the network quality. As another example, the system may identify that the information currently available to the system is old and may therefore request an update. The system may also request the information at predetermined intervals. For example, the system may request information every time a user connects to a network, at particular time intervals, and the like.

Alternatively, to receive the information a user device may send the information at predetermined times. The information may be sent during a network access session, after the network access has ended, and the like. For example, during a network access session that is of a long duration, an embodiment may receive information regarding the network access quality multiple times during the network access. For information sent periodically throughout a network access, the information may be sent at predetermined time intervals (e.g., every five minutes, every thirty seconds, etc.), when a significant change in the network access quality is identified (e.g., the signal strength decreases, more static is identified, etc.), and the like. The system may also receive information using a combination of sources, for example, the system both requests information from user devices and also receives information without a previous request from user devices.

How frequently the information is sent or requested may be dependent on different factors. In one embodiment the information may be received based upon how dynamic the network quality status needs to be. For example, if the network is not accessed frequently the network quality may not need to be updated as frequently. As another example, if the network quality is fairly consistent, the information for determining the network quality may not be needed as frequently. In one embodiment the information may be received based upon the cost of transmission. For example, if a user has data access charges associated with accessing a network, the information may be received less frequently. One method for reducing the cost of transmission may be to use a mechanism such as unstructured supplementary service data (USSD), which allows the cellular networks to provide the data for performing the transmission of the information, thereby avoiding an explicit charge to the user.

In one embodiment the user may provide the information, for example, through feedback, answering a survey regarding the network access quality, and the like. As an example, after disconnecting from a data-based network access a user may be requested to provide a rating for the quality of the network access. The user may then provide the rating which can be sent to or captured by an embodiment. The user may be requested to send information after every network access or at other predetermined periods, for example, when the user accesses a different network, when the user is passed to another station on the same network, randomly, after a particular number of network accesses, and the like.

In one embodiment an application, installed on or accessible by the user device, may assess and infer a quality of a network access. The application may be stored on the network or a server. When a user accesses the network, the application may be employed or accessed by the user device automatically. The application may infer a quality of the network access based upon a predetermined condition. In one embodiment the predetermined condition may include the application identifying why a network access was disconnected (e.g., dropped by the network, user disconnected, out of network range, etc.). The predetermined condition may include how much static or noise is present on the network connection, how many data packets are dropped, and the like.

The information received may not only contain information related to the network access quality. The information may also contain geographic information, time information, route information, and the like. For example, the information may identify the geographic region or specific location that the user was located within while connected to the network. Geographic information may also include a specific route that was taken by a user while connected to the network. For example, if a user is connected to the network during a telephone call while driving, the geographic information may include the route that was traveled during the network access. The geographic information may also include the network towers that were accessed during the network access. For example, a user traveling while connected to the network may access multiple network towers during the network access. The geographic information may also include the location information of a nearby device whose location information is available. Time information may include a specific time and duration of the network access. Time information may additionally or alternatively include a time range or time frame that the user was connected to the network. For example, the time information could include that the user was connected during peak network hours, in the afternoon, between 10:00 a.m. and 11:00 a.m., and the like.

At 302, an embodiment may determine the quality of each of the telecommunications networks by aggregating and storing the information that was received at 301. The information and determined quality of the telecommunications network may be stored in a local, remote, or cloud storage location. For example, the server or data storage device may be a cloud server or a server in the network operator's network. The storage device may also be an edge server providing service at a given location.

In aggregating the information an embodiment may average the information received from multiple users of the telecommunications network. For example, if one user provides a quality rating of "poor" and another user provides a quality rating of "good," the system may average this information to identify the network quality as "fair." An embodiment may aggregate the information received for the entire network. Alternatively, an embodiment may aggregate information for a network within a particular geographic region or time frame. For example, an embodiment may aggregate the information received for a network between the times of 11:00 a.m. and 1:00 p.m.

Past information may be used by an embodiment to determine the quality of the telecommunications network. For example, an embodiment may use historical information for a particular time frame to identify an estimated network quality for a future time period. As an example, the system may identify that the network quality for non-peak hours has been a seven on a scale of one to ten for everyday for the past four weeks. The system may then infer that the network quality for non-peak hours for the current day will also be a seven. Using past information to infer the network quality for future network accesses may be done based upon a particular time frame, as shown in the example above, or may be done based upon other criteria, for example, geographical region, a particular user, and the like.

Additional information included in the information received from the users may be used and weighted in determining a network quality. In one embodiment, if location information is included with the received information, the accuracy of the location information may be used in determining the network quality. As an example, if the location information as provided by one user device is identified as being inaccurate, the quality information received from that device may be given a lower weight than quality information received from a device having more accurate location information. Similarly, other information may change a weighting of the quality information from a user device. For example, an embodiment may identify that the quality ratings from a particular user device are consistently lower than quality ratings from other user devices in the same geographical location and time frames. An embodiment may then weight the quality rating accordingly. Rather than weighting the quality ratings, one embodiment may completely ignore or disregard some quality ratings based upon similar factors.

At 303 an embodiment identifies whether a request for connecting to a network has been received from a user device. A request may include a user attempting to complete a network access (e.g., making a telephone call, connecting to the internet, etc.). If no request has been received, an embodiment may take no action at 305. If, however, a request has been received an embodiment may provide a recommendation of a telecommunications network that the user device should use in completing the desired network access at 304. The recommendation may be based upon a predicted quality of the network that may be based upon the determined quality of the plurality of telecommunications networks. For example, an embodiment may recommend the telecommunications network that has the highest determined quality.

An embodiment may not always recommend the network having the highest quality. One embodiment may recommend the network having the highest quality for the desired network access even if the network does not have the highest overall network quality. For example, if a user is attempting a voice-based network access, an embodiment may recommend the network having the highest quality for voice-based network accesses. As another example, if a user is traveling a particular route, an embodiment may recommend the network having the highest quality for the entirety of the route even though the network may not have the highest overall quality. The recommendation can additionally be based upon geographic region, time frame, and the like. For example, the network recommended may have the highest quality for a particular time frame, but not the highest overall quality.

In addition, the network recommendation may be based upon criteria as provided by the user which may change which network is recommended. For example, the user may indicate that only networks which would not cause the user to incur a cost should be used for connection of the user's device(s). An embodiment may then recommend a "free" network having the highest quality even if that network does not have the highest overall quality. Each of the criteria, either user provided or system provided, may have different weights associated with them. An embodiment may then provide a recommendation that maximizes the weighted sum of the criteria. Different users may have different weights associated with the criteria. For example, one user may indicate that cost is the most important criteria, while another user indicates that quality of the network access is the most important criteria. Thus, even though these users may be in the same location at the same time, the users may receive recommendations for two different networks.

The crowd sourcing network quality server may make a decision to select a network for a specific user based on one or more metrics obtained across users (e.g., the access link quality, network path throughput, network path delay, price of connectivity, etc.), for example, using a weighted metric across the metrics and across users to make a determination. As an example, assume that the weighted metric allocates a 70% weight to the link quality and a 30% weight to the price of connectivity and that the metrics are normalized in the range of 0 to 1. Further assume, for this example, that the average link quality metric is 0.65 and average price of connectivity metric is 0.75 across the users of particular Network1. The weighted metric for Network1 then has a value of 0.68 (i.e., 0.7*0.65+0.3*0.75). If the average link quality metric is 0.8 and average price of connectivity metric is 0.7 across the users of alternative Network2, then the weighted metric for Network2 is 0.77 (i.e., 0.7*0.8+0.3*0.7).

For a specific new user/device User 3 that is attempting to access a network, the weighted metric across networks can be compared to determine the best network, in this case Network2, for User3. Additionally, if the location of User3 is known, metrics reported by certain users who are closer to the location of User3 may be given a higher weight relative to metrics reported by users that are further away from User3's location. Alternatively, the network chosen may be made merely based upon the access points, base-stations, eNodeBs (LTE/4G access node), small cells, 5G access nodes, and the like, that User3 can connect to, and by averaging metrics across users connected to those access points, base-stations, eNodeBs, small cells, 5G access nodes, and the like.

The recommendation may not be an explicit recommendation (i.e., use Network A). Rather, the recommendation may include sending updates regarding the quality of the networks to the user or user device. The updates may include changes in the network quality. Alternatively, the updates may be provided as system models which indicate the quality of a network over a predetermined time period for a particular geographical location. The recommendation may be provided automatically or based upon a specific request for a recommendation by the user or user device. When the user then attempts to make a connection, the user device can identify the recommended network based upon the previously provided information. These recommendation updates may be sent periodically, when a significant change to the network quality is detected, and the like. Thus, the recommendation may be a predictive recommendation.

Alternatively, the recommendations may be made when the user attempts to access a network. The user device can then query the storage device having the network quality information for a recommendation. When querying the storage device the user device may provide information regarding the status of the user device, for example, the time of the request, the geographical location associated with the request, and the like. The user device may also pick a random network and request information from the storage device regarding that network. Based upon the response of the storage device, the user device may recommend using the network or may pick a different network to request information about. Thus, the recommendation may be a proactive recommendation.

In providing a recommendation an embodiment may provide a prompt that recommends one or more networks to the user on the user device. The user can then select the desired network for connection. Alternatively, an application or automated agent on the user device may process the recommendation and automatically select the network to be used for connection. The application may track information about the user device and predict future connectivity needs of the user. The application may then proactively retrieve information for these locations for when the user wants to connect to a network. Once the network has been selected, either automatically or manually, the system may initiate the requested network access.

As shown in FIG. 2, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method, comprising:
utilizing at least one processor to execute computer code that performs the steps of:
receiving information for a plurality of telecommunications networks, from at least one device, regarding quality of network access between at least one of a plurality of user devices and at least one of the plurality of telecommunications networks;
determining quality of each of the plurality of telecommunications networks by aggregating and storing the information received from the at least one device;

receiving a request from a device of a user to connect to a telecommunications network, wherein the request comprises information related to a requested access type to the telecommunications network by the device;

determining an overall quality for each of the plurality of telecommunications networks indicating an overall quality of the telecommunications network;

determining an access type quality of each of the plurality of telecommunications networks indicating a quality of the telecommunications network with respect to the access type; and providing, in response to receiving the request and based upon the determined quality of the plurality of telecommunications networks, a recommendation of a telecommunications network from the plurality of telecommunications networks for connection by the device of a user, wherein the recommendation is based upon the determined overall quality and the determined access type quality.

2. The method of claim 1, wherein the receiving the information comprises a user providing the information in response to a prompt.

3. The method of claim 1, wherein the receiving the information comprises an application providing the information based upon predetermined criteria.

4. The method of claim 1, wherein the at least one device is a device selected from: a server and a user device.

5. The method of claim 1, wherein the aggregating comprises averaging information received from multiple users of the telecommunications network.

6. The method of claim 1, wherein providing a recommendation comprises predicting a call quality for each of the plurality of telecommunications networks and selecting the telecommunications network meeting a predetermined condition.

7. The method of claim 1, comprising receiving at least one criterion from the user related to network access and wherein the providing a recommendation is further based upon the at least one criterion.

8. The method of claim 1, wherein the information comprises a geographic region and wherein the quality of the telecommunications network is identified for the geographic region.

9. The method of claim 1, wherein the information comprises time information and wherein the quality of the telecommunications network is identified for a time range.

10. The method of claim 1, wherein the quality is determined via a virtual network function within a data center.

11. The method of claim 10, wherein the data center selected for interaction with the at least one device is determined based upon at least one metric selected from the group consisting of: location of the at least one device, mobility of the at least one device, the location of the data center, and the end-to-end latency between the at least one device and the data center.

12. The method of claim 1, wherein the quality of a network access comprises a network path metric selected from the group consisting of: access link quality, access link throughput, access link delay, price of connectivity, network throughput, network delay, network congestion, number of calls dropped, and number of packets dropped.

13. An apparatus, comprising:
at least one processor; and
a computer readable storage medium having computer readable program code embodied therewith and executable by the at least one processor, the computer readable program code comprising:

computer readable program code that receives information for a plurality of telecommunications networks, from at least one device, regarding quality of network access between at least one of a plurality of user devices and at least one of the plurality of telecommunications networks;

computer readable program code that determines quality of each of the plurality of telecommunications networks by aggregating and storing the information received from the at least one device;

computer readable program code that receives a request from a device of a user to connect to a telecommunications network, wherein the request comprises information related to a requested access type to the telecommunications network by the device;

computer readable program code that determines an overall quality for each of the plurality of telecommunications networks indicating an overall quality of the telecommunications network;

computer readable program code that determines an access type quality of each of the plurality of telecommunications networks indicating a quality of the telecommunications network with respect to the access type; and computer readable program code that provides, in response to receiving the request and based upon the determined quality of the plurality of telecommunications networks, a recommendation of a telecommunications network from the plurality of telecommunications networks for connection by the device of a user, wherein the recommendation is based upon the determined overall quality and the determined access type quality.

14. A computer program product, comprising:
a non-transitory computer readable storage medium having computer readable program code embodied therewith, the computer readable program code comprising:

computer readable program code that receives information for a plurality of telecommunications networks, from at least one device, regarding quality of network access between at least one of a plurality of user devices and at least one of the plurality of telecommunications networks;

computer readable program code that determines quality of each of the plurality of telecommunications networks by aggregating and storing the information received from the at least one device;

computer readable program code that receives a request from a device of a user to connect to a telecommunications network, wherein the request comprises information related to a requested access type to the telecommunications network by the device; and computer readable program code that determines an overall quality for each of the plurality of telecommunications networks indicating an overall quality of the telecommunications network;

computer readable program code that determines an access type quality of each of the plurality of telecommunications networks indicating a quality of the telecommunications network with respect to the access type; and computer readable program code that provides, in response to receiving the request and based upon the determined quality of the plurality of telecommunications networks, a recommendation of a telecommunications network from the plurality of telecommunications networks for connection by the device of a user, wherein the recommendation is based upon the determined overall quality and the determined access type quality.

15. The computer program product of claim 14, wherein the receiving the information comprises an application providing the information based upon predetermined criteria, wherein the predetermined criteria comprise an identification of a reason for disconnection of the network access.

16. The computer program product of claim 14, wherein the aggregating comprises averaging information received from multiple users of the telecommunications network.

17. The computer program product of claim 14, wherein providing a recommendation comprises predicting a call quality for each of the plurality of telecommunications networks and selecting the telecommunications network meeting a predetermined condition.

18. The computer program product of claim 14, comprising receiving at least one criterion from the user related to network access and wherein the providing a recommendation is further based upon the at least one criterion.

19. The computer program product of claim 14, wherein the information comprises information regarding the quality of a network access along an entire route.

20. A method, comprising:
receiving quality information, from at least one device, for a plurality of telecommunications networks, wherein the quality information is based upon a communication access to a telecommunications network by a user device;
determining quality of each of the plurality of telecommunications networks by analyzing the quality information from the at least one device;
receiving a request from a user device to identify a telecommunications network to be used for network access, wherein the request comprises information related to a requested access type to the telecommunications network by the device;
determining an overall quality for each of the plurality of telecommunications networks indicating an overall quality of the telecommunications network;
determining an access type quality of each of the plurality of telecommunications networks indicating a quality of the telecommunications network with respect to the access type; and
identifying, in response to receiving the request, a telecommunications network from the plurality of telecommunications networks for the network access by the user device, wherein the identifying is based upon the determined overall quality and the determined access type quality and identifying the telecommunications network having the highest access type quality for the requested access type.

* * * * *